Figure 4:
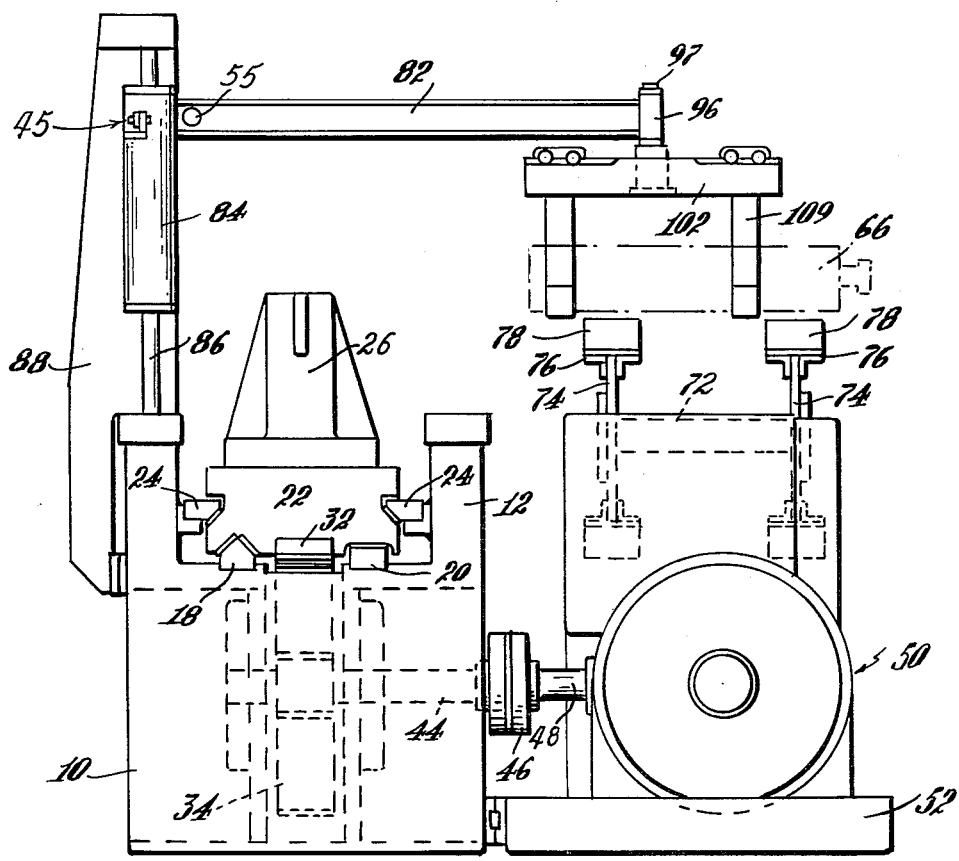

July 31, 1962     O. W. BONNAFE     3,046,846
HORIZONTAL BROACHING MACHINE
Filed June 27, 1960     5 Sheets-Sheet 1
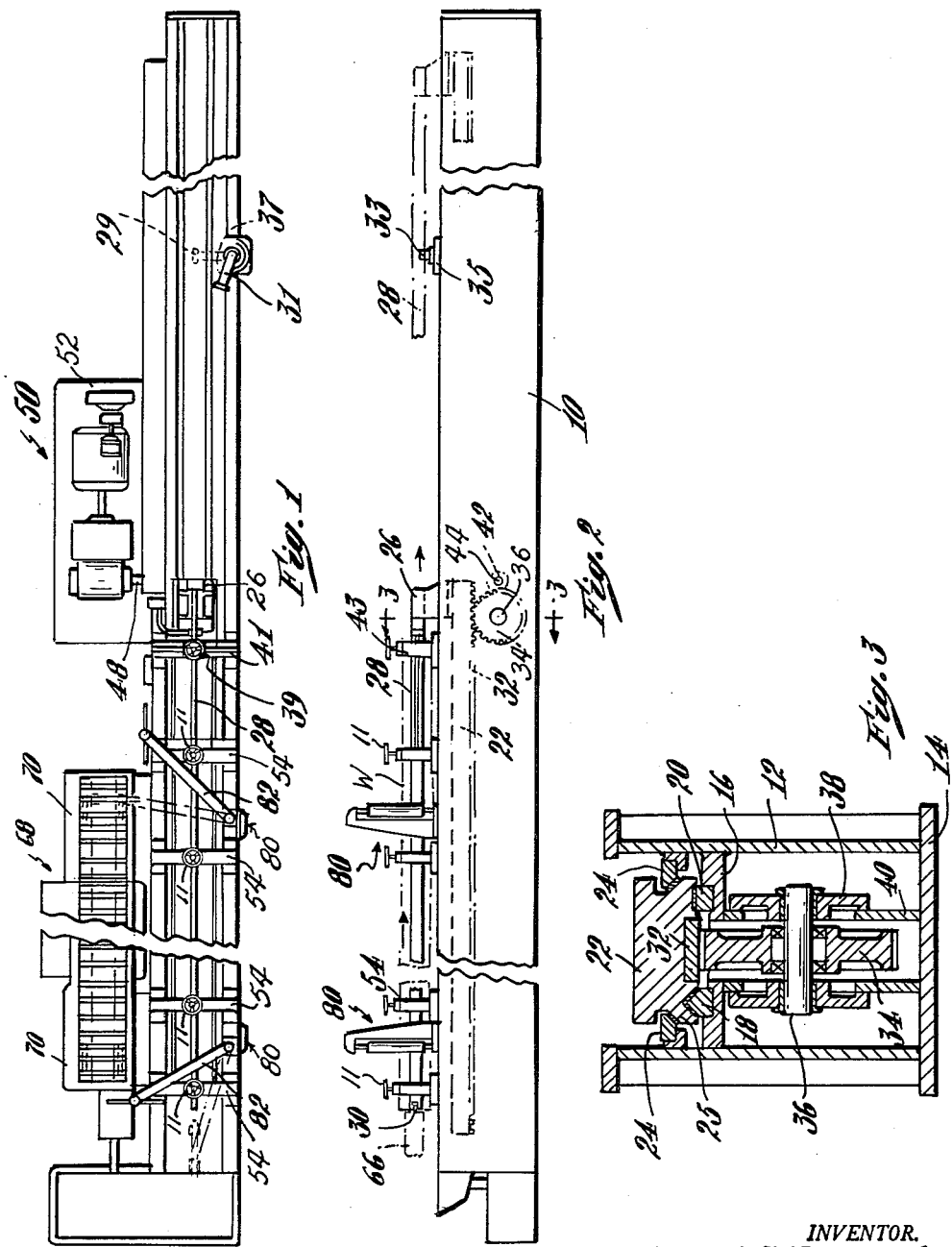
INVENTOR.
Oliver W. Bonnafe
BY
Roberts, Cushman + Grover
ATT'YS July 31, 1962　　　O. W. BONNAFE　　　3,046,846
HORIZONTAL BROACHING MACHINE Filed June 27, 1960　　　　　　　　　　　　5 Sheets-Sheet 2

INVENTOR.
Oliver W. Bonnafe
BY
Roberts, Cushman & Grover
ATT'YS

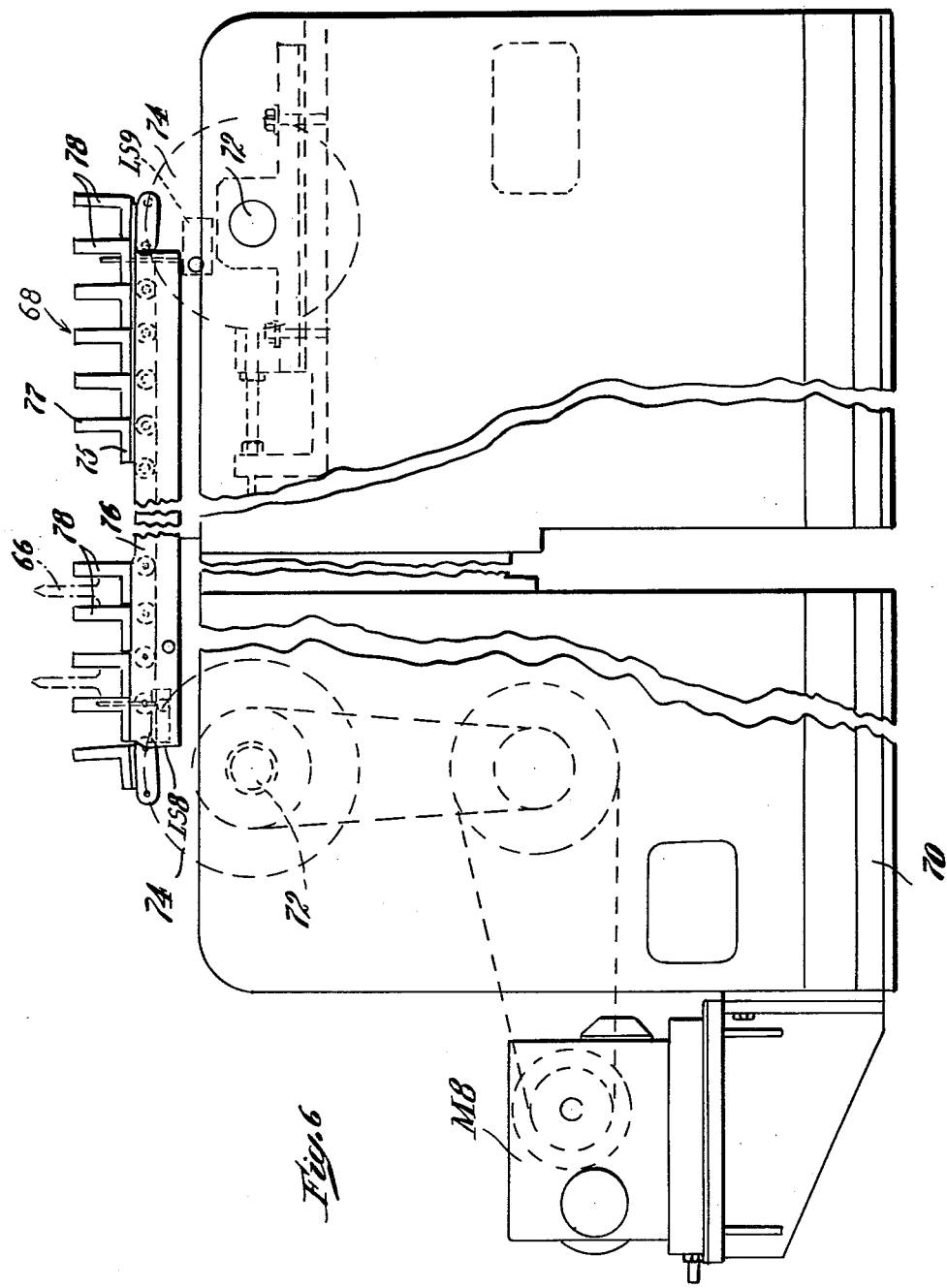

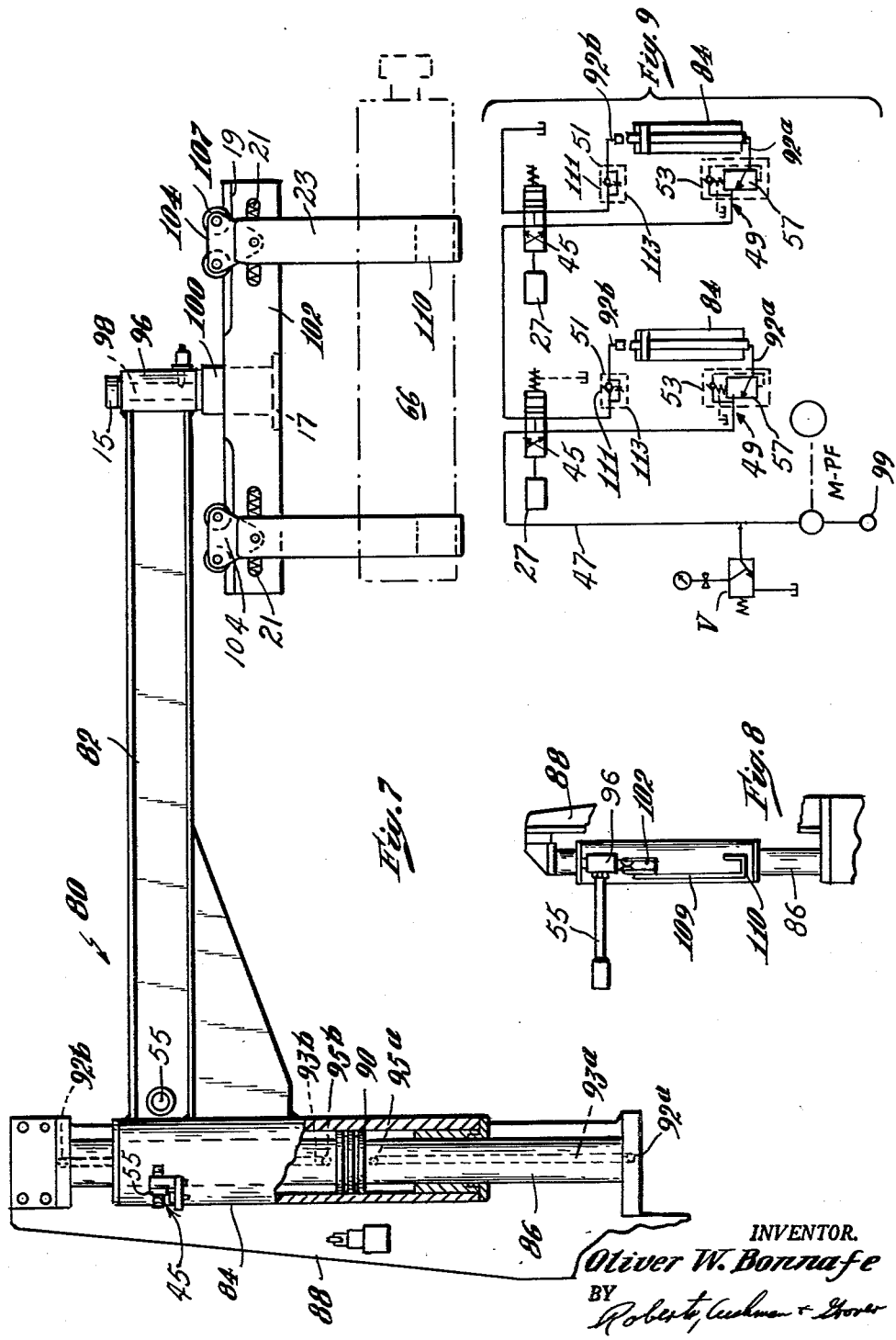

July 31, 1962     O. W. BONNAFE     3,046,846
HORIZONTAL BROACHING MACHINE
Filed June 27, 1960     5 Sheets-Sheet 5

INVENTOR.
Oliver W. Bonnafe
BY
Roberts, Cushman + Grover
ATT'YS

United States Patent Office 3,046,846
Patented July 31, 1962

3,046,846
HORIZONTAL BROACHING MACHINE
Oliver W. Bonnafe, Hudson, Mass., assignor to The Lapointe Machine Tool Company, Hudson, Mass., a corporation of Maine
Filed June 27, 1960, Ser. No. 39,038
9 Claims. (Cl. 90—92)

This invention relates to horizontal broaching machines for broaching work pieces of extreme length and has for its principal objects to provide apparatus for use in conjunction with a broaching machine for making available a succession of broaches, one after another, as they are needed and to restore them to a position for reuse; to provide an apparatus for storage of a plurality of broaches in readiness for use; to provide an apparatus in which disposing individual broaches in a position to be used and removing them after use is made easy; to provide an apparatus which eliminates handling individual broaches thus eliminating possible damage of the broaches and injury to personnel; and to provide an apparatus in which the transfer of the broaches in succession is semi-automatic. Other objects are to provide apparatus which is of simple construction and requires no more than ordinary skill to operate.

In accordance with the foregoing, there is an elongate frame mounting a work support and draw bar for movement of the latter lengthwise of the frame. The draw bar has jaws at one end for gripping an end of a broach to pull it through a work piece mounted on the frame and there is a carrier adjacent the frame for supporting a plurality of broaches which, used in succession, will cut the work to size. The carrier is movable in timed relation with the draw bar so as to move the broach next to be used, following a given operation, to a position to be attached to the draw bar. The broaches are supported transversely of the direction of movement of the draw bar to permit storage of all of the broaches within a small space while one is being used, and there is means for stopping the carrier in a position at the forward end of the apparatus to permit transferring a broach from the carrier to the draw bar. A transfer device is arranged adjacent that forward end of the carrier by means of which a bar to be transferred from the carrier may be lifted therefrom and moved opposite the draw bar. There is a similar transfer device at the other end of the carrier for disengaging the broach pulled through the work from the draw bar, and restoring it to the carrier. The carrier is an endless conveyor having a run parallel to the work support and supports a plurality of spaced parallel trays within which individual broaches may be placed without touching each other. Each of the transfer devices comprises a horizontally disposed arm supported at one end for vertical movement to raise and lower the arm and spaced hooks at its distal end rotatable about a vertical axis so as to be disposable crosswise of the conveyor to engage or disengage a broach thereon, and axially of the support to permit placing an end of a broach opposite the draw bar or removing a broach from engagement with the draw bar. Elevation of the arm is effected by fluid pressure.

Figure 5:
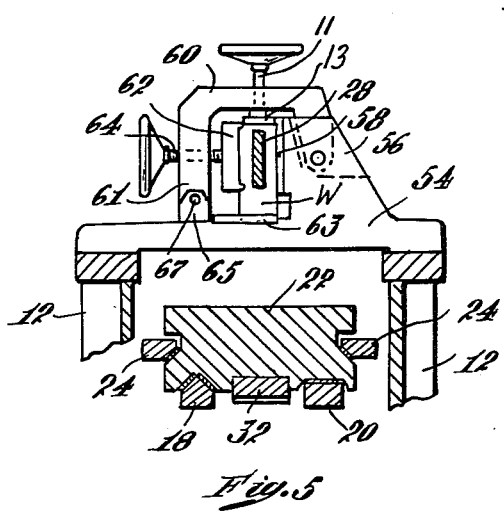
Figure 10:
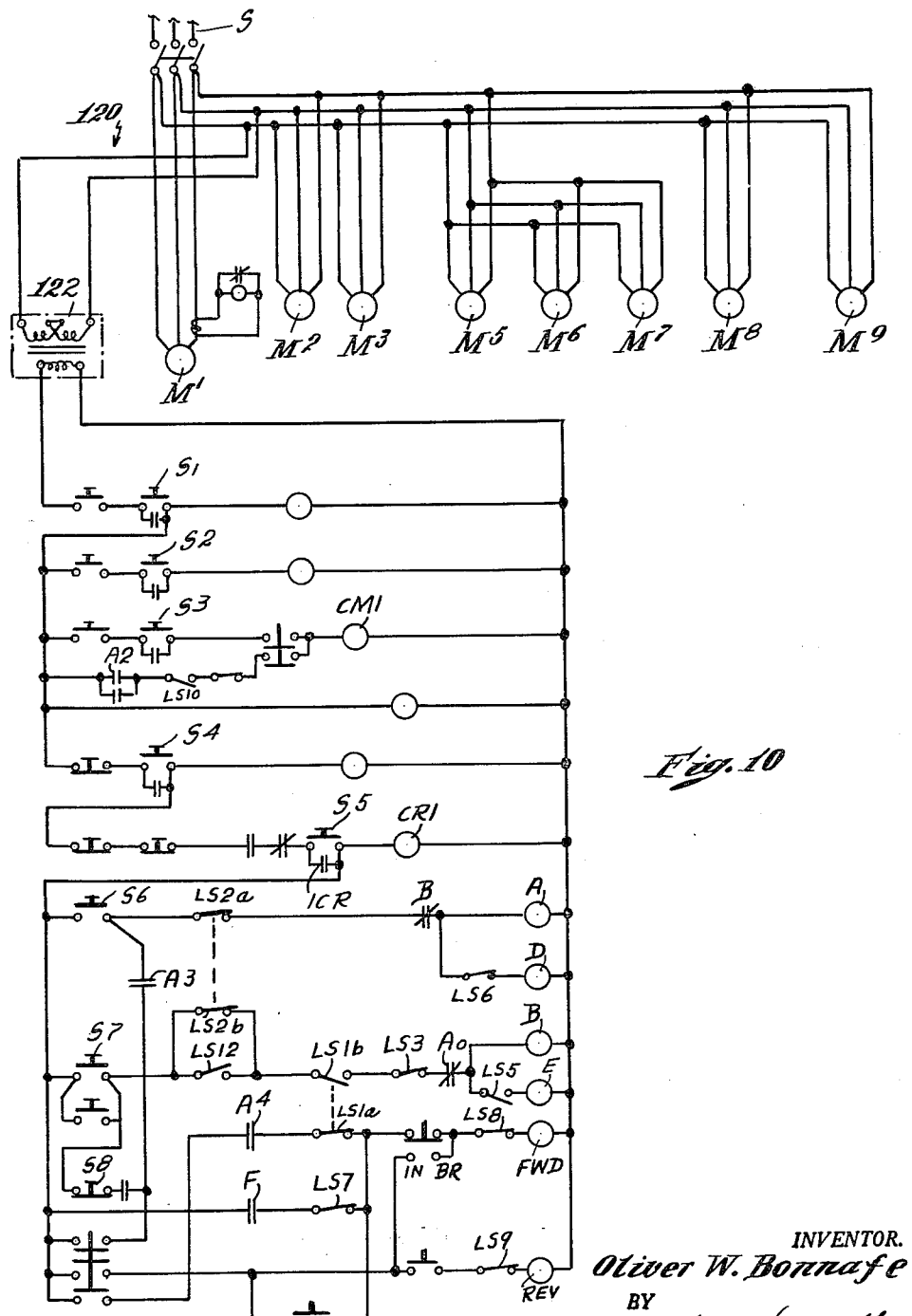

The invention will now be described in greater detail with reference to the accompanying drawings wherein:
FIG. 1 is a plan view of the broaching machine;
FIG. 2 is a side elevation;
FIG. 3 is a vertical transverse section taken on the line 3—3 of FIG. 2;
FIG. 4 is an end elevation as seen from the left end of FIG. 1;
FIG. 5 is a fragmentary vertical section taken on the line 5—5 of FIG. 2;
FIG. 6 is a side elevation of the endless conveyor broken intermediate its ends showing the broach supporting pockets;
FIG. 7 is an elevation to much larger scale showing the transfer device;
FIG. 8 is an elevation of the transfer device to much smaller scale at right angles to that shown in FIG. 7.
FIG. 9 is a diagram of the hydraulic system for the transfer device; and
FIG. 10 shows the wiring diagram for the apparatus.

Referring to the drawings, the machine has a long, substantially rectangular box-like frame 10, having spaced parallel, vertically disposed side walls 12 secured at their lower ends to a flat base plate 14 and supporting between their upper and lower ends a horizontally disposed bed plate 16. The bed plate 16 supports longitudinally extending V-shaped and flat ways 18 and 20 upon which there is slidably mounted a slide 22, the latter being held firmly engaged with the ways 18 and 20 by rails 24—24 fastened to the inner sides of the walls 12, so as to bear upon inclined ways 25—25 in the lateral edges of the slide. The slide 22 supports a post 26 to which the rear end of a draw bar 28 is attached. By movement of the slide 22 the draw bar may be moved longitudinally of the frame 10 from the rear end, as shown in dotted lines (FIG. 2), to the forward end as shown in full lines, the forward end having jaws 30 for engagement with a broach. The slide 22 has on its underside a rack 32 (FIG. 3) for engagement with a gear 34 mounted on a transversely disposed shaft 36, supported in bearing plates 38 fastened to vertically disposed struts 40. A pinion 42 meshes with the gear 34 and is fast to a horizontally disposed shaft 44 which extends laterally from the base through one of the side walls and is connected by a coupling 46 to a shaft 48 extending from a driving unit 50 mounted on a flat base plate 52 connected to one side of the frame 10, as shown in FIG. 4.

The draw bar 28 is supported intermediate its ends when retracted by a roller 29 mounted on a horizontally disposed arm 31 fastened to a post 33 on one of the walls 12, so that it may be swung from a position extending transversely of the base to an out-of-the-way position as shown in FIG. 1. The post 33 is rotatable in a bearing 35 and has at its lower end an arm 37 which is engaged by forward movement of the post 26 to swing the arm 31 out of the way. A second support roller 39 is mounted forwardly of the roller 29, adjacent the rear end of the work support on a shaft 41 mounted between brackets 43. The roller 39 is fixed permanently in place since it is far enough forward so that when the post 26 abuts, or is adjacent to its rear side, the forward end of the draw bar projects through the forward end of the work at its extreme forward position.

At the forward end of the frame 10 there are a plurality of work supports 54 disposed transversely of the frame, four of which are shown. Each support (FIG. 5) has an upstanding post 56 supporting a vertically disposed clamping plate 58 at one side of the center line of the frame. An arm 60 is pivoted on the post which extends transversely therefrom and has a downwardly projecting leg 61 through which there is threaded a screw 64. The screw supports a clamping plate 62 for adjustment to and from the plate 58, so that a work piece w (FIG. 5) may be clamped between the plates 58 and 62 with its lower edge resting on a bearing plate 63. The leg 61 extends downwardly between the legs of a clevis 65 and has a hole through it for receiving a clevis pin 67 disposed in the legs of the clevis. The arm also carries a vertically disposed threaded hole in which there is mounted a clamping screw 11, the lower end of which carries a clamping plate 13 for engagement with the top edge of the work. By the use of suitable shims the work may be shifted with respect to the center line of the draw bar so that a broach pulled through the work will make its cut in the proper position.

With a work piece supported in the aforesaid clamps, the draw bar 28 is advanced from its rearmost position forwardly until the jaw 30 at its forward end projects from the forward end of the work piece. At this position the leading end of a broach 66 is engaged with the jaw 30 and then the draw bar is pulled rearwardly through the work to make its cut. A series of broaches are used of increasing size to progressively enlarge the hole through the work and to bring it to size. In accordance with this invention, the entire number of broaches which are required for a given operation are stored in such fashion that they are readily available, one after another, for engagement with the draw bar without individual handling since, as a general rule, they are heavy, slippery with oil and can be easily damaged by accidental dropping. Storage is provided by a conveyor 68 (FIGS. 1 and 6) disposed parallel to the frame, with one end near the rear end of the work and the other end near the forward end of the work for supporting a plurality of broaches, side by side, for movement, one after another, from a position at the rear end of the work to a position at the forward end thereof. As illustrated (FIG. 6), a support 70 is connected to the base of the frame 10, upon which there are mounted horizontal shafts 72 to which are fastened spaced parallel sprockets 74, about which there are entrained endless chains 76. The links of the chains support L-shaped trays 78 made of a hard wood. As shown in FIG. 6, each tray is made up of a flat bottom 75 and a vertical wall 77. The broaches 66 are placed with an edge on the horizontal bottom 75 and are supported therein between adjacent walls 77. The wooden trays cushion the cutting edges of the broaches so as not to damage them. The conveyor is driven in timed relation with the forward movement of the draw bar so that when the latter reaches its forward position a broach will be in a position to be transferred from the conveyor to the draw bar. The means for effecting such movement of the conveyor will be described hereinafter.

For transferring a broach from the carrier to the draw bar and after the broach has been pulled through the work, for re-transferring it from the draw bar to the conveyor, transfer devices 80 are provided, one at the rear end of the conveyor and the other at the forward end.

Each transfer device (FIGS. 7 and 8) comprises a horizontally disposed rigid arm 82 fastened at one end to a vertically disposed sleeve in the form of a cylinder 84 mounted on a vertically disposed rod 86, which constitutes a piston rod for movement of the cylinder in elevation on the rod and for swinging movement angularly about the axis of the rod. The rod 86 is fastened at its ends to a vertically disposed bracket 88 and has fixed to it a piston 90 which divides the interior of the cylinder 84 into chambers at its upper and lower sides. The ends of the cylinder are suitably packed to prevent leakage of fluid and fluid pressure is supplied to the opposite sides of the piston 90 by means of conductors 92a and 92b, which enter the opposite ends of the piston rod, the latter having axial passages 93a and 93b which terminate adjacent the piston in ports 95a and 95b. A handle 55 is fixed to the arm for effecting rotation about the vertical axis of the rod. Such movement is produced manually by pushing on the handle. Upward and downward movement of the arm is assisted by supplying fluid pressure to the opposite sides of the piston as will appear hereinafter.

At the distal end of the arm 82 there is a vertically disposed sleeve 96 within which there is mounted a spindle 98 having a head 15 at its upper end. The lower end of the spindle 98 projects downwardly from the sleeve 96 and rotatably supports a cylindrical bearing 100 which has an end flange 17. A horizontal bar 102 is mounted on the bearing for rotation thereon. Near the opposite ends of the bar 102 there are spaced parallel grooves 19 for receiving the rollers 107 of a pair of hangers 104, so that the latter are movable lengthwise of the bar 102 to facilitate moving the broach lengthwise when engaging it with the draw bar clamp. Springs 21 are mounted in the slots at opposite sides of the hanger so as to hold them centered. The hangers, in turn, pivotally support the shanks 23 of a pair of hooks 110 which are adapted to receive and support a broach on edge.

As previously stated, there are two such transfer devices, one located at a position near the forward end of the conveyor and the other at a position near the rear end of the conveyor. When the draw bar has been advanced through the work into a position to receive a broach and the conveyor has come to rest, the operator standing at the head of the machine grasps the handle 55 and swings the arm 82 from a position more or less parallel to the side of the machine, crosswise thereof, so as to bring the hooks into engagement with the broach nearest the forward end of the conveyor. Then, by manipulation, he can engage the hooks with the broach, lift it from the conveyor and swing it into a position of alignment with the draw bar, as shown in dotted lines in FIG. 1. The draw bar is then engaged with the leading end of the broach and broaching is effected by drawing the broach through the work. When the broach clears the rear end of the work the operator manipulates the transfer device at that end of the work so as to bring the hooks into parallel relation to the broach and engage them therewith. The jaws of the draw bar are then disengaged from the broach and the operator may then raise the broach to transfer it back onto the conveyor.

Vertical movement of the arm 82 and hence the hanger is effected by supplying oil to the upper or lower ends of the piston rod 86, as previously pointed out. To this end there is provided at each transfer device a valve 45 (FIG. 9). Each valve is connected by a conductor pipe 47 with a motor driven pump M–PF which, in turn, is connected to an oil sump 99. A relief valve V in the pipe provides for by-passing oil from the sump in the event that pressure exceeds a predetermined amount. The valves 45 have manually operable levers 27 which are normally held in a neutral position so that oil flows from the pump through the valves to the sump. Each valve is connected to the opposite end of the piston rod by way of valves 49 and 51. Each valve 49 contains a check 53 through which oil may be pumped to supply oil to the lower end of the cylinder and a regulator 57 through which oil may vent to the sump when the pressure reaches a predetermined amount. The regulator 57 acts as a balancer and may be set so that it will support the weight of the arm, broach and cylinder. The valve 51 has a check 111 through which oil may be pumped to the upper end of the cylinder and a regulator 113 in the form of a needle which may be set to control the rate of venting.

Operation of the apparatus is effected as follows: Referring to FIG. 10 there are a main motor M1, hydraulic motor M2, coolant motors M3 and M9, blower motor M5, lubricating motors M6 and M7, and broach conveyor motor M8. These motors are all connected to an outside power supply by a main switch S and are controlled by a circuit 120 which is connected to the power supply by way of a transformer 122. The only motors which are of primary consideration in describing the operation of the apparatus are the main motor M1, the broach conveyor motor M8 and the coolant motor M9. After closing the switch S the motor starting switches S1, S2, S3 and S4 are closed. A switch S5 is also closed. Closing switch S5 supplies current to a relay CR1 which, in turn, closes switch 1CR to supply current to the several relays and limit switches which control the movement of the draw bar and the conveyor. To start a cut, switch S6 is closed which energizes relays A and D. Energizing relay A opens switch Ao and closes switches A1, A2, A3 and A4. The switch A1 (not shown) is in the motor M1 and closing this switch supplies current to the motor in a direction to move the draw bar rearwardly on its cut stroke. At this time, limit switch LS1b is closed and since switch A4 is closed current is supplied to a relay FWD which starts the conveyor motor M8. Relay FWD also closes switch F so that current is supplied through switch F to relay FWD to hold it closed. The motor M8 continues to run until the conveyor moves the next broach in line up to the loading position at the forward end of the conveyor. A trip on the conveyor operates to momentarily open the limit switch LS7 which thus stops the motor M8 and hence the conveyor because in the interim the limit switch LS1a has been opened as will now appear. As the broach enters the work so as to fill the opening, that is, to plug the opening, it closes a limit switch LS10. Since switch A2 is closed current is supplied to a relay CM1 which, in turn, closes a switch (not shown) for starting the coolant motor M9. Limit switch LS1b is closed, limit switch LS1a is open and limit switch LS5 is closed. Near the end of the cutting stroke limit switch LS6 is mechanically opened so as to de-energize relay D. De-energizing relay D opens a switch Ds in the circuit of the motor M1 (not shown) so that a resistance is introduced into the motor circuit and hence slows it down, thus slowing down the broach. When the broach finally clears the work at its rear end it mechanically opens a limit switch LS2a and closes a limit switch LS2b. Opening switch LS2a de-energizes relay A and hence closes switch Ao and opens switches A1 to A4 inclusive. Opening switch LS2b supplies current to relays B and E. Now, if the broach has been removed, depression of a return switch S7 will energize relays B and E. Energizing relay B closes a switch in the motor circuit to reverse the current to the motor M1 in a direction to return the draw bar to its forward position. If the broach has not been removed limit switch LS12 is held open so that depression of the switch S7 will not start the motor. To jog the draw bar into position at the start of the return stroke, as it is moved up to the hole in the work piece, a jog switch S8 is open so that by repeatedly pressing the return switch S7, the draw bar may be inched up to the work. After the draw bar has entered the work the jog switch is closed and the return switch closed so as to cause the motor to drive the draw bar to the work. Near the end of the travel of the draw bar, toward its forward end, the limit switch LS5 is open which de-energizes relay A and hence closes a switch in the motor circuit to place a resistance in the motor circuit and slowing it down. As the broach emerges from the work limit switch LS3 is mechanically opened to stop the motor. The conveyor is normally driven in a forward direction, however, a reversing relay REV is included in its driving circuit to permit it to be moved rearwardly in the event that it is desirable to shift the carrier rearwardly. There are also safety switches LS8 and LS9 disposed so as to be contacted by the broaches at the ends of the carrier to prevent the carrier from running over the end with a broach in one of the trays, which would thereby permit it to drop off the tray and become damaged.

The internal wiring circuit of the motor M1 which includes the reversing switches and the resistances which may be cut in by closing switches therein is of conventional construction and hence is not disclosed herein.

It should be understood that the present disclosure is for the purpose of illustration only and that this invention includes all modifications and equivalents which fall within the scope of the appended claims.

I claim:

1. In a broaching machine, a work support, a draw bar, means supporting the draw bar parallel to the work support for reciprocation through a predetermined stroke, rearwardly on a cutting stroke, and forwardly on a return stroke, a reversible motor for effecting reciprocation, jaws at the forward ends of the draw bar for engagement with a broach, and means for stopping the draw bar at each end of its stroke; a carrier mounting a plurality of broach-receiving pockets for holding a plurality of broaches in spaced parallel relation in horizontal positions, said carrier having its forward and rear ends situated at the forward and rear ends of the stroke of the draw bar, an intermittently operable motor for effecting movement of the carrier forwardly to move a broach-receiving pocket into a position adjacent the forward end of the draw bar stroke for transfer of a broach therefrom to the draw bar, a transfer device at the forward end of the machine movable to a position above the broach-receiving pocket, at the forward end, to engage and lift a broach from the pocket and move it into a position in alignment with the draw bar for engagement with the jaws at the forward end of the draw bar, means operable during the rearward movement of the draw bar to initiate operation of the carrier motor to advance the next broach-carrying pocket in succession, into position at the forward end of the carrier, and to stop it at said position, and means operable when the draw bar reaches the rearmost end of the stroke to remove the broach from the draw bar and replace it in an empty pocket at the end of the carrier.

2. A broaching machine according to claim 1, wherein there is a jogging switch operable to inch the carrier forwardly or rearwardly.

3. A broaching machine according to claim 1, wherein there is an indexing switch operable to advance the carrier a distance corresponding to that between successive broaches.

4. A broaching machine according to claim 1, wherein each transfer device has an arm supported at one end at the side of the work support opposite the carrier for movement heightwise and angularly in a horizontal plane, said arm being of such length that, when disposed transversely across the work support at right angles to the direction of movement of the carrier, the distal end lies on the center line of the carrier, said arm being movable angularly to a position such that the distal end lies on the axis of the draw bar, a pair of spaced hangers pivotally supported at the distal end of the arm for movement about a vertical axis, said hangers being adapted to be engaged with the underside of a broach resting on the carrier, and means for effecting swinging and heightwise movement of the arm and the hangers into engagement with a broach on the carrier, lift it therefrom, and transfer it into a position of alignment with the forward end of the broach puller.

5. In combination with a broaching machine having a horizontal work support, a draw bar movable relative thereto forwardly and rearwardly, and an endless carrier parallel to the work support for supporting a plurality of broaches in readiness for connection to the draw bar; a transfer device at each end of the work support, one for removing a broach from the carrier and transferring it to a position to be attached to the draw bar at the forward end of the work support, the other for supporting the broach while detaching it from the draw bar at the rear end of the work support and returning it to the carrier, each device comprising a rigid, vertically disposed piston rod supporting a piston, said piston rod being fixed to the frame at a side of the work support opposite the carrier, a cylinder mounted on the rod for heightwise movement thereon, and rotary movement about its axis, a rigid, horizontally disposed arm fixed at one end to the cylinder, said arm being of such length that its distal end will lie on the center line of the carrier when the arm extends transversely of the work support at right angles to the direction of movement of the carrier, and may be moved to a position to lie on the center line of the work support, a hanger pivotally suspended from the distal end of the arm, a handle on the cylinder operable to turn the cylinder on the rod, and means selectively operable to raise and lower the cylinder on the rod.

6. A broaching machine according to claim 5, wherein the means selectively operable to raise and lower the cylinders on the rod comprises valves for supplying fluid pressure to the opposite sides of the piston, and a manually operable valve for selectively supplying fluid pressure to one of the two valves and venting the other.

7. A broaching machine according to claim 5, wherein the means selectively operable to raise and lower the cylinder on the rod comprises valves for supplying and venting fluid pressure from the cylinder at opposite sides of the piston, a manually operable valve for selectively supplying fluid pressure to one valve and venting it from the other, and means associated with the valve at the lower end adjustable to resist venting up to the combined weight of the cylinder, arm and broach supported thereby.

8. A broaching machine according to claim 5, wherein the piston rod contains axially extending passages from its ends, inwardly to near the opposite sides of the piston, where they are ported into the cylinder, and the means selectively operable to raise and lower the cylinder comprises valves for supplying and venting fluid pressure through the passages in the piston rod, and a manually operable valve for selectively supplying fluid pressure to one of the valves and venting it from the other.

9. A broaching machine according to claim 5, wherein the means selectively operable to raise and lower the cylinder on the rod comprises valves for supplying fluid pressure to the opposite sides of the piston, and a manually operable valve normally occupying a neutral position, said valve being selectively operable to supply pressure to either one of the valves and vent the other, and movable to its neutral position at any time to halt the flow of fluid from said valve and hence to stop the cylinder in a selected heightwise position.

References Cited in the file of this patent
UNITED STATES PATENTS

| | | |
|---|---|---|
| 2,408,521 | Lapointe | Oct. 1, 1946 |
| 2,601,376 | Eaton | June 24, 1952 |
| 2,779,490 | Clarke et al. | Jan. 29, 1957 |
| 2,894,647 | McCorkle | July 14, 1959 |
| 2,923,210 | Roberts | Feb. 2, 1960 |
| 2,925,016 | Walter et al. | Feb. 16, 1960 |